| United States Patent [19] | [11] Patent Number: 4,966,977 |
| Takaki et al. | [45] Date of Patent: Oct. 30, 1990 |

[54] PROCESS FOR THE PREPARATION OF INDIGO COMPOUNDS

[75] Inventors: Usaji Takaki, Fujisawa; Shinobu Aoki, Yokohama; Yoshihiro Yamamoto, Yokohama; Isao Hara, Yokohama, all of Japan

[73] Assignee: Mitsui Toatsu Chemicals, Incorporated, Tokyo, Japan

[21] Appl. No.: 324,503

[22] Filed: Mar. 16, 1989

[30] Foreign Application Priority Data

Mar. 17, 1988 [JP] Japan .................................. 63-062010
Apr. 6, 1988 [JP] Japan .................................. 63-083043

[51] Int. Cl.$^5$ .......................................... C07D 403/04
[52] U.S. Cl. .................................................. 548/457
[58] Field of Search .......................................... 548/457

[56] References Cited

FOREIGN PATENT DOCUMENTS 54-124027 9/1979 Japan .

OTHER PUBLICATIONS

S. Coffey, ed., Rodd's Chemistry of Carbon Compounds, 2nd Ed., vol. IV, Part B, Heterocyclic Compounds, pp. 350–357.

Beilsteins Handbuch der Organischen Chemie, Sachregister fur die Bande 23–25, Index, pp. 281–284.

*Primary Examiner*—David B. Springer
*Attorney, Agent, or Firm*—Millen, White & Zelano

[57] ABSTRACT

A process for the preparation of an indigo compound by reacting an indole compound having no substituent at the 2- and 3-positions with hydrogen peroxide in a liquid phase composed of at least two separate phases including an organic phase containing the indole compound and an aqueous phase containing hydrogen peroxide, or by reacting the indole compound with hydrogen peroxide in solution in an organic solvent.

16 Claims, No Drawings

PROCESS FOR THE PREPARATION OF INDIGO COMPOUNDS

BACKGROUND OF THE INVENTION

1. Field of the Invention

This invention relates to a process for the preparation of an indigo compound by reacting an indol compound having no substituent at the 2- and 3-positions with hydrogen peroxide in a specific liquid-phase reaction system.

2. Description of the Prior Art:

Indigo compounds are important compounds that are useful as dyes. The presently employed industrial processes for the preparation of indigo comprise forming an N-phenylglycine salt from aniline and chloroacetic acid, or from aniline, cyanic acid and formaldehyde, converting this salt into an indoxyl compound by alkali fusion at elevated temperature, and then oxidizing this compound with air. However, these processes are not only complicated ones having many steps, but also require the use of large amounts of potassium hydroxide and sodium hydroxide. Moreover the recovery and reuse of used potassium hydroxide and sodium hydroxide has the disadvantage of consuming much energy and requiring special equipment. Therefore, conversion to a simpler process has been desired.

Meanwhile, a report has been published in which indole was reacted with an aqueous solution of hydrogen peroxide in a liquid phase made homogeneous by the addition of methanol (Khim. Geterotsikl. Soedin., Vol. 11, pp. 1490–1496, 1978). It is stated therein that a trimer of indole, or 2,2-diindyl-ψ-indoxyl, was formed in high yield and, in addition, indigo could be detected by chromatography. However, the object of this report was to prepare 2,2-diindyl-ψ-indoxyl by the oxidation of indole, and the indigo that is the desired product in the present invention was nothing but a by-product formed in very small amounts. Accordingly, this is not a satisfactory process for the preparation of indigo compounds.

SUMMARY OF THE INVENTION

It is an object of the present invention to provide a process for preparing an indigo compound in enhanced yield by oxidizing an indole compound having no substituent at the 2- and 3-positions with hydrogen peroxide.

The present inventors have carried on an intensive study to develop a method for preparing an indigo compound efficiently by reacting an indole compound with hydrogen peroxide, and have unexpectedly found that the formation of an indigo compound can be greatly increased by reacting an indole compound having no substituent at the 2- and 3-positions with hydrogen peroxide in a liquid phase composed of at least two separate phases including an organic phase containing the indole compound and an aqueous phase containing hydrogen peroxide, or by reacting the indole compound with hydrogen peroxide in solution in an organic solvent. The present invention has been completed on the basis of these findings.

According to the present invention, there is provided a process for the preparation of an indigo compound which comprises reacting a corresponding indole compound having no substituent at the 2- and 3-positions with hydrogen peroxide in a liquid phase composed of at least two distinct phases including an organic phase containing the indole compound and an aqueous phase containing hydrogen peroxide, or reacting a corresponding indole compound having no substituent at the 2- and 3positions with hydrogen peroxide in solution in an organic solvent.

DESCRIPTION OF THE PREFERRED EMBODIMENTS

The indole compound having no substituent at the 2- and 3-positions, which is used as one of the starting materials in the process of the present invention, is selected from the group consisting of indole; alkylindoles having 1 to 4 alkyl groups of 1 to 10 carbon atoms, such as 1-methylindole, 4-ethylindole, 5-methylindole, 6-methylindole, 6-isopropylindole, 7-methylindole and 4,5-dimethylindole; halogenated indoles having 1 to 4 halogen atoms, such as 4-chloroindole, 5-chloroindole, 5,7-dichloroindole, 5-bromoindole, 6-bromoindole, 5,7-dibromoindole and 4-chloro-5-bromoindole; hydroxyindoles having 1 to 4 hydroxyl groups, such as 4-hydroxyindole, 5-hydroxyindole and 4,5-dihydroxyindole; halogenated alkylindoles having 1 to 3 halogen atoms and 1 to 3 alkyl groups of 1 to 10 carbon atoms, such as 4-chloro5-ethylindole, 6-chloro-4-methylindole, 4-bromo and 5-bromo-4-methylindole; nitroindoles having 1 to 4 nitro groups, such as 4-nitroindole, 5-nitroindole and 7-nitroindole; indolecarboxylic acids, such as indole-5-carboxylic acid, and esters thereof; sulfonated indoles, and indoles bearing a combination of 2 or more different such groups. At positions other than the 2- and 3-positions, these indole compounds may have any substituents that do not interfere with the reaction.

Although the amount of hydrogen peroxide used for the reaction is not critical, it is usually in the range of 0.01 to 100 moles, preferably 0.1 to 40 moles, per mole of the indole compound.

The process of the present invention is carried out by reacting the indole compound with hydrogen peroxide in a liquid phase composed of at least two separate phases including an organic phase containing the indole compound and an aqueous phase containing hydrogen peroxide, or by reacting the indole compound with hydrogen peroxide in solution in an organic solvent.

Where the reaction is carried out in a liquid phase composed of at least two separate phases including an organic phase containing the indole compound and an aqueous phase containing hydrogen peroxide, the hydrogen peroxide may be used in the form of an aqueous solution, a solution in another suitable solvent, pure hydrogen peroxide, or a precursor which can produce hydrogen peroxide under the reaction conditions. However, it is essential to produce an aqueous solution of hydrogen peroxide in the reaction system and thereby form an aqueous phase. Although the amount of water used is not critical, it is usually sufficient to cause the concentration of hydrogen peroxide in the aqueous phase to be in the range of 1 to 70% by weight, and preferably in the range of 20 to 50% by weight.

If the indole compound is liquid at the reaction temperature, the organic phase may consist of the indole compound itself. However, an organic solvent may be present according to circumstances. For example, an organic solvent may be used to dissolve the indole compound, or the starting hydrogen peroxide may be used in the form of a solution in an organic solvent other than water. For these purposes, hydrophobic, weakly hydrophilic and hydrophilic organic solvents can be used so long as they do not interfere with the reaction. However, the type and amount of organic solvent used should not be such that the indole compound, hydrogen peroxide, water and the organic solvent form a single homogeneous liquid phase. Usually, an aprotic solvent is preferred as the organic solvent.

In addition to the organic phase containing the indole compound and the aqueous phase containing hydrogen peroxide, a third or more liquid phases may be formed depending on the type and amount of organic solvent added, but it does not matter. Where used, the organic solvent may comprise a single compound or a mixture of two or more compounds. It may happen that the organic phase containing the indole compound is separated from the aqueous phase containing hydrogen peroxide within a certain time from the start of the reaction, but a single liquid phase is formed as the indole compound is consumed with the progress of the reaction. However, this is also within the scope of the present invention, provided that at least a part of the reaction takes place in a liquid phase composed of at least two separate phases including an organic phase containing the indole compound and an aqueous phase containing hydrogen peroxide.

On the other hand, where the process of the present invention is carried out by reacting the indole compound with hydrogen peroxide in solution in an organic solvent, it is necessary to provide an organic solvent solution of hydrogen peroxide. That is, if the starting hydrogen peroxide is in the form of an aqueous solution, an organic solvent solution of hydrogen peroxide is prepared by separating hydrogen peroxide from the aqueous solution through extraction with the organic solvent. That is unnecessary if the starting hydrogen peroxide is in the form of a solution in an organic solvent other than water.

Such an organic solvent solution of hydrogen peroxide can be directly used for the reaction. If desired, its concentration may be controlled prior to use, for example, by diluting the solution with the same or different organic solvent or by concentrating the solution through evaporation of the organic solvent. If the starting hydrogen peroxide is in its pure form, it may be used as it is or after dilution with an organic solvent. In order to prepare an organic solvent solution of hydrogen peroxide, there may be used any organic solvent that can dissolve hydrogen peroxide and does not interfere with the reaction. However, it is usually preferable to use an aprotic solvent. Although the amount of organic solvent used is not critical, it is usually sufficient to cause the concentration of hydrogen peroxide in the organic solvent to be in the range of 0.001 to 50% by weight, and preferably in the range of 0.1 to 40% by weight.

The reaction is carried out in a liquid phase. Although the reaction system may form a heterogeneous liquid phase in which the indole compound is separated from the organic solvent solution of hydrogen peroxide, it is usually preferable that the reaction system forms a homogeneous liquid phase. Typically, only the organic solvent used to prepare the hydrogen peroxide solution is present in the reaction system, and this organic solvent also serves as the reaction solvent. However, another organic solvent may be added to the reaction system, for example, in order to dissolve the indole compound or make the reaction system a homogeneous liquid phase. In such a case, although there may be used any organic solvent that meets the intended purpose and does not interfere with the reaction, an aprotic solvent is usually preferred as the organic solvent. It does not matter if a second or more liquid phases are formed depending on the type and amount of organic solvent used. This additional organic solvent may comprise a single compound or a mixture of two or more compounds.

As described above, the organic solvent present in the reaction system is preferably an aprotic solvent in either case. Aprotic solvents are organic solvents having no protic hydrogen atom, and examples thereof include aliphatic and alicyclic hydrocarbons such as n-hexane, 2-methylpentane, n-octane, isooctane, cyclohexane, bicyclohexyl and p-menthane; aromatic hydrocarbons and alkyl substituted aromatic hydrocarbons such as benzene, toluene, xylene, ethylbenzene, cumene, p-cymene and naphthalene; aliphatic and aromatic halogen compounds such as dichloromethane, carbon tetrachloride, 1,2-dichloroethane, chlorobenzene, bromobenzene, chlorotoluene and dichlorobenzene; ethers such as diethyl ether, diphenyl ether, tetrahydrofuran, ethylene glycol diethyl ether and phenetole; ketones such as acetone, methyl ethyl ketone, acetonylacetone and acetophenone; esters such as propyl acetate, ethyl propionate, methyl benzoate and dimethyl phthalate; carbonates such as dimethyl carbonate and propylene carbonate; aliphatic and aromatic nitro compounds such as nitroethane and nitrobenzene; and nitriles such as acetonitrile and benzonitrile. These solvents may be used alone or in admixture of two or more.

In the process of the present invention, no particular limitation is placed on the method by which the reaction is carried out. Thus, the reaction may be carried out in any of batch, semibatch and continuous operations.

It is preferable to carry out the reaction under agitation. The reaction temperature is usually in the range of −10° to 140° C. If the reaction temperature is too low, the reaction will become unduly slow, while if it is too high, the reaction will involve the risk of explosion of the hydrogen peroxide. Preferably, the reaction temperature is in the range of 10° to 100° C. The reaction time is usually within 50 hours and preferably in the range of 0.1 to 24 hours. The reaction may be carried out under subatmospheric, atmospheric or superatmospheric pressure.

In the process of the present invention, the reaction may be carried out under an atmosphere of an inert gas or in the presence of molecular oxygen such as air.

In the process of the present invention, the yield or selectivity of the indigo compound or the formation rate thereof can further be improved by using suitable additives and/or catalysts.

In the process of the present invention, the desired indigo compound can be obtained by working up the resulting reaction mixture in the usual manner. On completion of the reaction, most of the formed indigo compound has usually separated out. Therefore, the indigo compound can easily be recovered from the reaction mixture in the form of a solid according to a conventional solid-liquid separation technique such as filtration, centrifugation or decantation. Where the amount of the precipitated indigo compound is insufficient, it is also possible to concentrate the reaction mixture and then recover the resulting larger amount of precipitate therefrom.

The present invention is further illustrated by the following examples. These examples are intended to illustrate the invention and are not to be construed to limit the scope of the invention.

EXAMPLE 1

A three neck flask having a capacity of 100 ml and fitted with a stirrer, a thermometer and a cooling coil was charged with 5.0 g (42.7 mmoles) of indole, 35 ml of water and 14.5 g (128 mmoles as hydrogen peroxide) of a 30 wt.% aqueous solution of hydrogen peroxide. When this mixture was heated to 80° C. in a preheated oil bath, the indole melted to form an organic phase separate from the aqueous phase. At this temperature, the mixture was allowed to react for 5 hours under agitation. With the progress of the reaction, a deep blue solid gradually separated out. After completion of the reaction, the resulting reaction mixture was filtered. The solid so separated was thoroughly washed with methanol (indigo is hardly soluble in methanol) and then dried at 50° C. under reduced pressure to obtain 951.9 mg of a deep blue solid product. Elemental analysis and IR spectroscopic analysis revealed that this product was indigo. The molar yield of the isolated indigo as based on the charged indole (hereinafter referred to briefly as the yield of isolated indigo) was 17.0%.

EXAMPLES 2–8 AND COMPARATIVE EXAMPLE 1

Indole and a 30 wt.% aqueous solution of hydrogen peroxide were charged and allowed to react in the same manner as in Example 1, except that 35 ml of each of the solvents listed in Table 1 was used in place of the water (35 ml) used in Example 1. The state of phase separation at the start of the reaction and the outcome of the reaction are summarized in Table 1.

EXAMPLE 9

The procedure of Example 1 was repeated except that the reaction temperature was altered to 73° C. Thus, there was obtained 587.9 mg of indigo. The yield of isolated indigo was 10.5%.

EXAMPLE 10

Starting materials were charged in the same manner as in Example 9 and hence in Example 1, except that a mixture of 20 ml of water and 15 ml of methanol was used in place of the water (35 ml) used in Example 9 and hence in Example 1. Upon heating, the mixture separated into an organic phase and an aqueous phase. When this mixture was allowed to react in the same manner as in Example 9, there was obtained 537.5 mg of indigo. The yield of isolated indigo was 9.6%.

COMPARATIVE EXAMPLE 2

Starting materials were charged in the same manner as in Example 9, except that 35 ml of methanol was used in place of the water (35 ml) used in Example 9 and hence in Example 1. The mixture formed a single homogeneous phase. Upon heating to reflux, its temperature reached 73° C. When this mixture was allowed to react in the same manner as in Example 9 and then filtered, a large amount of dark brown solid was obtained. However, when this solid was washed with methanol, most of it dissolved away and only 24.1 mg of a black solid product was obtained. The IR spectrum of this product did not coincide with that of indigo.

EXAMPLE 11

The procedure of Example 9 was repeated except that 35 ml of diphenyl ether was used in place of the water (35 ml) used in Example 9 and hence in Example 1. The reaction system separated into an organic phase and an aqueous phase. The yield of isolated indigo was 11.2%.

EXAMPLE 12

The procedure of Example 1 was repeated except that a flask similar to the reactor of Example 1 but having a capacity of 200 ml was used, the water (35 ml) used in Example 1 was replaced by 35 ml of toluene, and the amount of the 30 wt.% aqueous solution of hydrogen peroxide was altered to 145.2 g. The reaction system separated into an organic phase and an aqueous phase. The yield of isolated indigo was 20.3%.

EXAMPLE 13

The procedure of Example 1 was repeated except that the indole used in Example 1 was replaced by 8.37 g (42.7 mmoles) of 5-bromoindole and the water (35 ml) by 35 ml of toluene. The reaction system separated into an organic phase and an aqueous phase. The yield of isolated 5,5'-dibromoindigo was 5.1%.

EXAMPLE 14

The same reactor as used in Example 1 was charged with 5.0 g (42.7 mmoles) of indole and an acetophenone solution of hydrogen peroxide which had been prepared by placing 50 ml of a 30 wt.% aqueous solution of hydrogen peroxide and 75 ml of acetophenone in a separatory funnel, shaking it well and then removing the aqueous phase from the acetophenone phase. The mixture formed a single homogeneous organic phase. When the mixture was allowed to react in the same manner as in Example 1, the yield of isolated indigo was 4.8%.

TABLE 1

| Example | Solvent | Number of phases Organic phase(s) | Aqueous phase | Yield of isolated indigo (%) |
| --- | --- | --- | --- | --- |
| Example 2 | n-Octane | 2 | 1 | 25.3 |
| Example 3 | Toluene | 1 | 1 | 15.2 |
| Example 4 | Monochlorobenzene | 1 | 1 | 17.6 |
| Example 5 | Diphenyl ether | 1 | 1 | 17.8 |
| Example 6 | Cumene | 1 | 1 | 14.6 |
| Example 7 | Acetophenone | 1 | 1 | 12.5 |
| Example 8 | Cumyl alcohol | 1 | 1 | 10.8 |
| Comparative Example 1 | Ethanol | Single homogeneous phase | | 1.8 |

We claim:
1. In a process for preparing an indigo compound wherein an indole compound is oxidized to produce the indigo compound, the improvement wherein the indole is unsubstituted at the 2- and 3- positions and is oxidized with 0.01 to 100 moles of hydrogen peroxide per mole of the indole compound at a temperature of from −10° to 140° for up to 50 hours, either a) as a solution in an organic solvent or b) in a liquid phase having at least a separate organic phase containing the indole compound and an aqueous phase containing the hydrogen peroxide, thereby forming the indigo compound.

2. A process as claimed in claim 1 wherein the reaction is carried out as a solution in the organic solvent.

3. A process as claimed in claim 2 wherein the organic solvent is an aprotic solvent.

4. A process as claimed in claim 1 wherein the indole compound is at least one compound selected from the group consisting of indole, alkylindoles, halogenated indoles, hydroxyindoles, halogenated alkylindoles, nitroindoles, indolecarboxylic acids and esters thereof, and sulfonated indoles.

5. A process as claimed in claim 1 wherein the indole compound is indole.

6. A process as claimed in claim 2 wherein the indole compound in indole or 5-bromoindole.

7. A process as claimed in claim 1 wherein the concentration of hydrogen peroxide in the aqueous phase is in the range of 1 to 70% by weight.

8. A process as claimed in claim 2 wherein the organic solvent is at least one aprotic solvent selected from the group consisting of aliphatic and alicyclic hydrocarbons, aromatic hydrocarbons, alkyl substituted aromatic hydrocarbons, aliphatic and aromatic halogen compounds, ethers, ketones, esters, carbonates, aliphatic and aromatic nitro compounds, and nitriles.

9. A process as claimed in claim 1 wherein the formed indigo compound is recovered from the reaction mixture in the form of a solid according to a solid-liquid separation technique.

10. A process as claimed in claim 1, wherein the reaction is conducted as a solution in an organic solvent.

11. A process as claimed in claim 10 wherein the organic solvent is an aprotic solvent.

12. A process as claimed in claim 10 wherein the indole compound is at least one compound selected from the group consisting of indole, alkylindoles, halogenated indoles, hydroxyindoles, halogenated alkylindoles, nitroindoles, indolecarboxylic acids and esters thereof, and sulfonated indoles.

13. A process as claimed in claim 10 wherein the indole compound is indole.

14. A process as claimed in claim 10 wherein the concentration of hydrogen peroxide in the organic solvent is in the range of 0.001 to 50% by weight.

15. A process as claimed in claim 10 wherein the organic solvent is at least one aprotic solvent selected from the group consisting of aliphatic and alicyclic hydrocarbons, aromatic hydrocarbons, alkyl substituted aromatic hydrocarbons, aliphatic and aromatic halogen compounds, ethers, ketones, esters, carbonates, aliphatic and aromatic nitro compounds, and nitriles.

16. A process as claimed in claim 10 wherein the formed indigo compound is recovered from the reaction mixture in the form of a solid according to a solid-liquid separation technique.

* * * * *